(12) United States Patent
An et al.

(10) Patent No.: US 10,739,992 B2
(45) Date of Patent: Aug. 11, 2020

(54) ELECTRONIC DEVICE AND OPERATION METHOD THEREOF

(71) Applicant: Samsung Electronics Co., Ltd., Suwon-si, Gyeonggi-do (KR)

(72) Inventors: Jinwan An, Daegu (KR); Jinyoung Kim, Gumi-si (KR); Yunjeong Choi, Gumi-si (KR); Yonggil Han, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 880 days.

(21) Appl. No.: 14/812,346

(22) Filed: Jul. 29, 2015

(65) Prior Publication Data

US 2016/0048270 A1    Feb. 18, 2016

(30) Foreign Application Priority Data

Aug. 12, 2014    (KR) ........................ 10-2014-0104247

(51) Int. Cl.
| | |
|---|---|
| *G06F 3/01* | (2006.01) |
| *G06F 3/048* | (2013.01) |
| *G06F 3/0484* | (2013.01) |
| *G06F 3/0488* | (2013.01) |
| *G06F 3/023* | (2006.01) |

(52) U.S. Cl.
CPC ........ *G06F 3/04886* (2013.01); *G06F 3/0237* (2013.01); *G06F 3/01* (2013.01); *G06F 2203/04803* (2013.01)

(58) Field of Classification Search
CPC ............. G06F 9/4446; G06F 17/30873; G06F 17/30882; G06F 3/0482; H04N 21/482; H04L 67/06; G09G 2340/145
See application file for complete search history.

(56) References Cited

U.S. PATENT DOCUMENTS

| 6,279,014 | B1 * | 8/2001 | Schilit ................... G06F 40/169 715/234 |
|---|---|---|---|
| 9,916,328 | B1 * | 3/2018 | Sharifi ................. G06F 16/156 |
| 2006/0242109 | A1 * | 10/2006 | Pereira ................. G06F 17/276 |
| 2006/0282575 | A1 * | 12/2006 | Schultz ............... G06F 3/04883 710/62 |
| 2007/0005338 | A1 * | 1/2007 | Vrijsen ............... G06F 17/2735 704/3 |
| 2013/0097173 | A1 * | 4/2013 | Stovicek ............. G06F 3/04883 707/741 |
| 2015/0088817 | A1 * | 3/2015 | Dwan ............... G06F 17/30115 707/610 |

(Continued)

*Primary Examiner* — Li P Sun
*Assistant Examiner* — Le Nguyen
(74) *Attorney, Agent, or Firm* — Jefferson IP Law, LLP

(57) ABSTRACT

An electronic device and an operation method thereof are provided. The method includes displaying information on a touch screen of the electronic device by operating a first application, displaying user interface of a second application, detecting an input through the user interface, displaying at least one recommendation object corresponding to the input among the information on the touch screen, at least partly in response to the input, receiving an input of selecting at least one of the at least one recommendation object, and displaying the recommendation object on the user interface, in response to the selecting input.

17 Claims, 19 Drawing Sheets

(56) References Cited

U.S. PATENT DOCUMENTS

2015/0248411 A1* 9/2015 Krinker ............... G06F 17/3064
                                                          707/748
2017/0180498 A1* 6/2017 Woon ...................... A63F 13/35

* cited by examiner

ELECTRONIC DEVICE AND OPERATION METHOD THEREOF

CROSS-REFERENCE TO RELATED APPLICATION(S)

This application claims the benefit under 35 U.S.C. § 119(a) of a Korean patent application filed on Aug. 12, 2014 in the Korean Intellectual Property Office and assigned Serial number 10-2014-0104247, the entire disclosure of which is hereby incorporated by reference.

TECHNICAL FIELD

The present disclosure relates to an electronic device and an operation method thereof. More particularly, the present disclosure relates to a method and an apparatus for processing an input in multi-window.

BACKGROUND

An electronic device may provide a multi-window function which enables use of many application screens simultaneously in a screen. Through the multi-window function provided by the electronic device, a user may perform two independent operations simultaneously in a single electronic device. Therefore, the user's efficiency may significantly increase when performing two independent operations simultaneously. For example, while executing an Internet page desired by user, the user may execute a Notepad function in the multi-window screen and record the contents of the Internet page on the Notepad. When the electronic device inputs text into the Notepad, the electronic device may provide a prediction word function which recommends a word (e.g., a word preceded by the text) related to the above text.

However, the prediction word function may provide a word depending on the frequency of usage used by a dictionary or the user. That is, since such a function does not display the word included in the Internet page required by the user by priority, the user may experience an inconvenience when recording the contents of the Internet page in the Notepad.

The electronic device and an operation method thereof according to an embodiment of the present disclosure may provide an environment in which information may be inputted accurately and rapidly in the state in which a screen including the information and a text inputtable screen are displayed on the multi-window screen. To this end, when the text inputtable screen is displayed, the electronic device may automatically extract and store the information in the screen including the information. In addition, the electronic device may provide a recommendation object corresponding to the text inputted in the text inputtable screen by priority based on the stored information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and an operation method thereof.

In accordance with an aspect of the present disclosure, a method of operating an electronic device is provided. The method includes displaying information on a touch screen of the electronic device by operating a first application, displaying user interface of a second application, detecting an input through the user interface, displaying at least one recommendation object corresponding to the input among the information on the touch screen, at least partly in response to the input, receiving an input of selecting the at least one recommendation object, and displaying the recommendation object on the user interface, in response to the selecting input.

In accordance with another aspect of the present disclosure, an electronic device is provided. The electronic device includes a touch screen configured to display a first application screen including information and a user interface of a second application, and detect an input through the user interface, and a controller configured to display at least one recommendation object corresponding to the input among the information on the touch screen, at least partly in response to the input, when detecting the input through the user interface of the second application, and display the recommendation object on the user interface of the second application, in response to a selecting input, when receiving the input of selecting the at least one recommendation object.

BRIEF DESCRIPTION OF THE DRAWINGS

The above and other aspects, features, and advantages certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
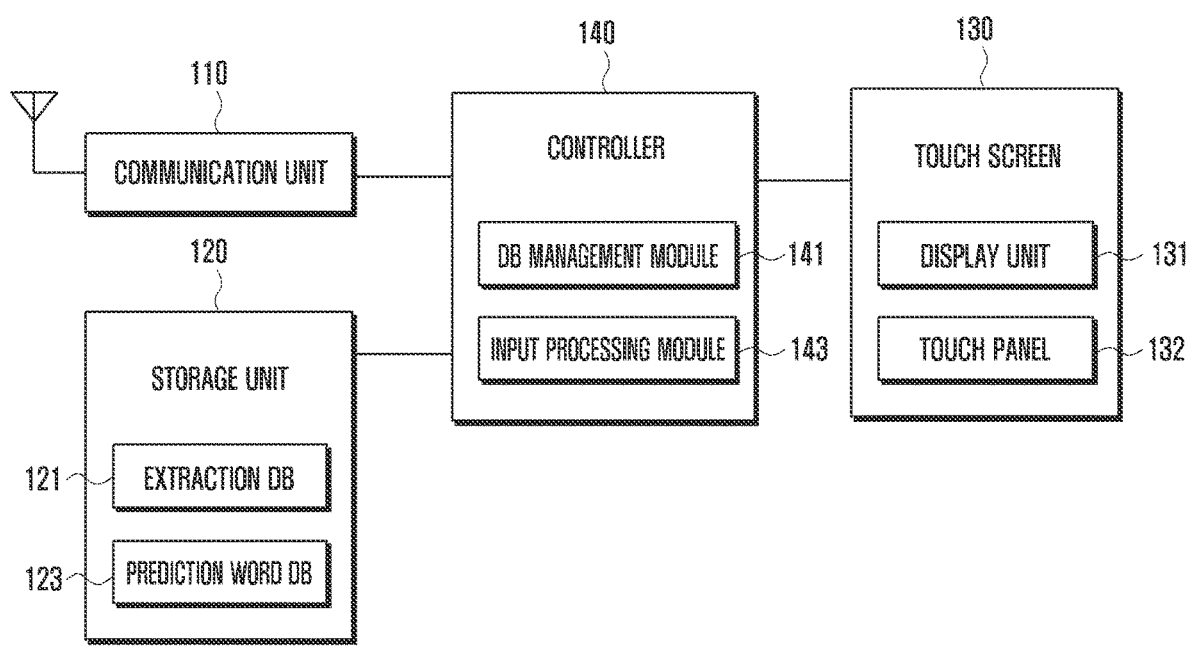
FIG. 1 is a diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to the description, an electronic device according to various embodiments of the present disclosure may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a moving picture experts group (MPEG-1 or MPEG-2) audio layer 3 (MP3) player, a mobile medical device, a camera, or a wearable device (e.g., a head-mounted display (HMD) like electronic glasses, electronic clothes, an electronic bracelet, an electronic necklace, an electronic accessory, an electronic tattoo, or a smartwatch).

In an embodiment of the present disclosure, when an execution request of a second application is detected while a first application screen is displayed, a user interface of the second application may be displayed on the multi-window screen. The second application is an application which is able to receive an input (e.g., text), and may include calendar, note, e-mail, a text application, a social network service (SNS) application, an instant messenger (IM) application. The user interface may include a menu user interface that includes an interface for performing a given function, and a keypad input user interface which may input text, a numeral, a mark, and the like. The user interface of a second application may be displayed in the form of multi-window screen which is at least one of a pop-up type or a screen division type.

Further, in an embodiment of the present disclosure, when an execution request of a second application is detected while a first application screen is displayed, it is possible to extract information displayed on the first application screen. In addition, the electronic device may store the extracted information in a storage device. The information may include text (e.g., a word, a sentence, a paragraph, and a numeral), an image, and the like. In an embodiment of the present disclosure, the operation of storing in the storage device may be an operation of configuring a database (DB) based on the extracted information. In a detailed operation of configuring the DB, when detecting the execution request of a second application, the electronic device may generate a temporary DB and temporarily store the information extracted from the first application screen.

In the embodiment of the present disclosure, it is assumed that the temporary DB is an extraction DB. The generated extraction DB may be added to an existing prediction word DB. In other words, the existing prediction word DB may be updated to a DB that includes the extraction DB. When detecting an input (e. g., text) through the user interface of a second application, the electronic device may extract and display a recommendation object corresponding to the input based on the updated DB. At this time, when extracting and displaying the recommendation object corresponding to the input based on the updated DB, the priority of the extraction DB may be set to be higher than the priority of the existing prediction word DB such that the recommendation object of the extraction DB may be displayed previously.

In various embodiments of the present disclosure, when a screen including information is displayed, the electronic device may extract the information and perform an operation of configuring DB. Then, when the user interface of a second application is displayed on the state where information is displayed as the first application is executed, the electronic device may perform or may not perform the operation of configuring DB based on whether there is a DB that stores information extracted from the first application screen.

In various embodiments of the present disclosure, the electronic device may display a screen that includes information due to the execution of the first application. When detecting the execution of the second application, the electronic device may display the user interface of a second application in the multi-window screen. When detecting the input through the user interface of the second application, the electronic device may search and display the recommendation object corresponding to the input from the first application, partly in response to the input.

In addition, in an embodiment of the present disclosure, it is assumed that a recommendation area is an area that displays a recommendation object corresponding to an input, when the input through the user interface of a second application is detected. In an embodiment of the present disclosure, when the input through the user interface is a text input (e. g., text including at least one character), the recommendation object corresponding to the inputted text may include at least one of a word, a sentence, or a paragraph including the text.

FIG. 1 is a diagram illustrating a configuration of an electronic device according to an embodiment of the present disclosure.

Referring to FIG. 1, the electronic device of the present disclosure may include a communication unit 110, a storage unit 120, a touch screen 130, and a controller 140, but is not limited thereto.

The communication unit 110 may perform a voice call, a video call, or a data communication with an external device over a network. The communication unit 110 may be configured of a RF transmitter for up-converting and amplifying a frequency of a transmitted signal and a RF receiver for low-noise amplifying a received signal and down-converting a frequency. In addition, the communication unit 110 may include a modulator and a demodulator. The modulator and the demodulator may include code division multiple access (CDMA), wideband CDMA (WCDMA), long term evolution (LTE), wireless fidelity (Wi-Fi), wireless-broadband (WIBRO), bluetooth (BT), near field communication (NFC), and the like. The communication unit 110 may be a mobile communication module, an Internet communication module and/or a short-range communication module.

The storage unit 120 may include a program memory for storing an operating program of the electronic device and a data memory for storing data generated while performing a program.

In particular, the storage unit 120 according to an embodiment of the present disclosure may include an extraction DB 121 and a prediction word DB 123.

The extraction DB 121 may be generated when the controller 140 detects an execution request of a second application under the control of the controller 140, and may store information extracted from the first application.

The prediction word DB 123 is an existing DB which provides information. When the extraction DB 121 is generated, the extraction DB 121 may be added to the prediction word DB 123. The prediction word DB 123 may be updated to a DB including the extraction DB 121.

The touch screen 130 may be configured of an integral type including a display unit 131 and a touch panel 132. The display unit 131 may display various screens in accordance with the use of the electronic device under the control of the controller 140. In addition, the display unit 131 may be configured of a liquid crystal display (LCD), organic LED (OLED), active matrix organic LED (AMOLED), Flexible Display, Bended Display. In addition, the display unit 131 may be implemented to be flexible, transparent, or wearable. The touch panel 132 may be a composite touch panel including a hand touch panel for detecting a hand gesture and a pen touch panel for detecting a pen gesture.

In particular, the display unit 131 according to an embodiment of the present disclosure may display an execution screen of the first application including information and a user interface of the second application which is able to receive an input (e.g., text) in the multi-window screen under the control of the controller 140. The touch panel 132 may detect an input through the user interface of the second application under the control of the controller 140. The display unit 131 may display the recommendation object corresponding to the input under the control of the controller 140. The touch panel 132 may detect an input that selects one of the recommendation objects under the control of the controller 140. The display unit 131 may display the selected recommendation object on the user interface of the second application under the control of the controller 140.

The controller 140 may control an overall operation of the electronic device and a signal flow between internal configurations of the electronic device, perform a data processing, and control the power supply from a battery to the above-described configurations.

In particular, in the embodiment of the present disclosure, the controller 140 may include a DB management module 141 and an input processing module 143.

When detecting an execution request of the second application while the first application is displayed, the DB management module 141 may extract information displayed on the first application and generate the extraction DB 121 to store the extracted information. In addition, when detecting that the second application is terminated, the DB management module 141 may delete the stored information. Alternatively, the DB management module 141 may delete the stored information after a certain time is elapsed.

When detecting an input through the user interface of the second application, the input processing module 143 may extract and display the recommendation object corresponding to the input based on the updated DB (the extraction DB 121 and the prediction word DB 123). When displaying the recommendation object, the input process module 143 may set the priority of the extraction DB 121 to be higher than the priority of the prediction word DB 123 such that the recommendation object of the extraction DB 121 may be displayed previously. When detecting an input of selecting one of the recommendation objects, the input processing module 143 may display the selected recommendation object in the user interface of the second application.

Figure 2:
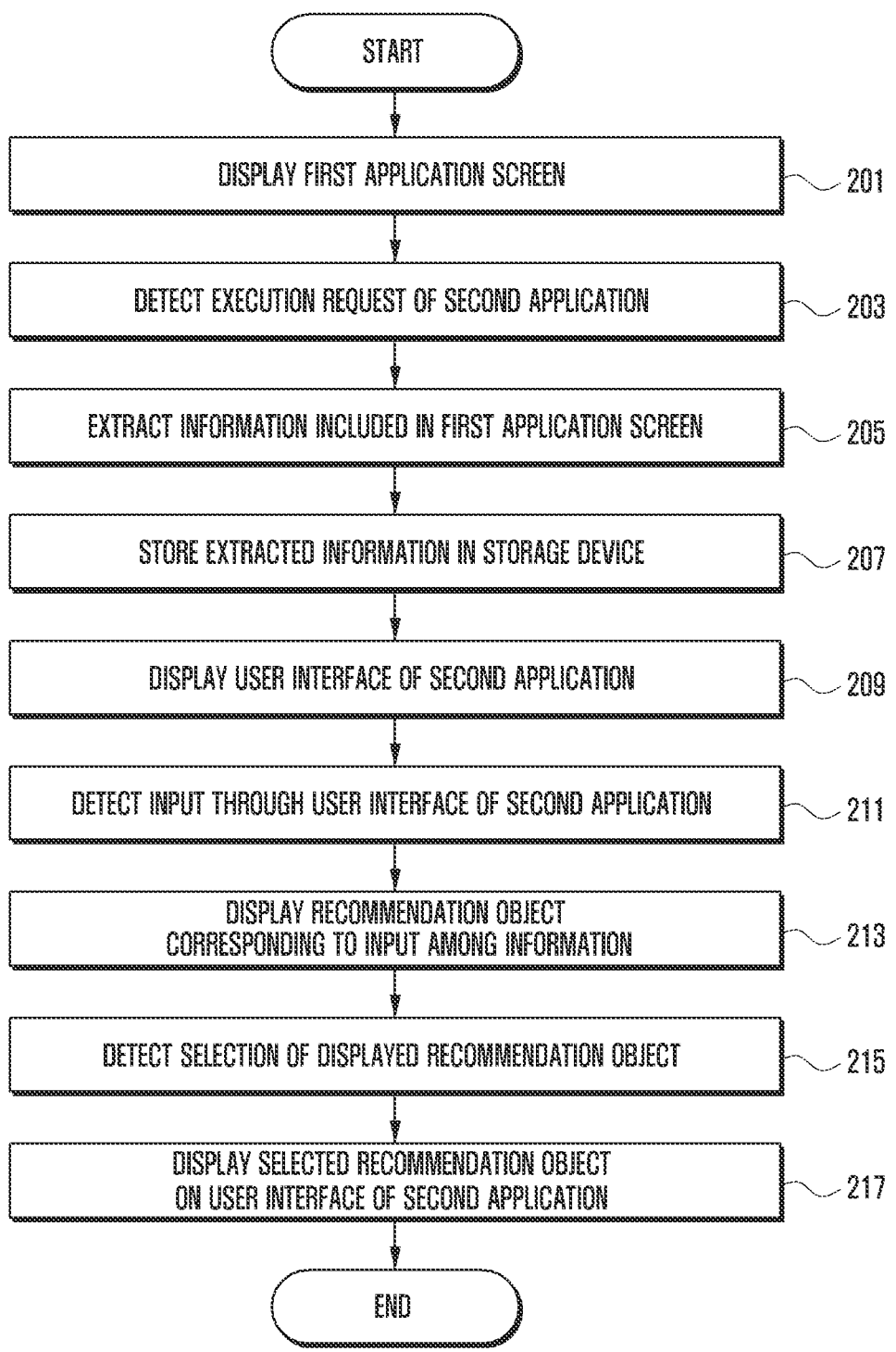
FIG. 2 is a flowchart illustrating a method of processing an input in a multi-window screen according to an embodiment of the present disclosure.

FIG. 2 is a flowchart illustrating a method of processing an input in multi-window screen according to an embodiment of the present disclosure.

Referring to FIG. 2, the controller 140 may execute a first application and display a screen that includes information at operation 201. Here, the information may include text, image, and the like.

The controller 140 may detect an execution request of the second application at operation 203. The second application according to an embodiment of the present disclosure may be an application which is able to receive an input (e.g., text), for example, may include calendar, note, e-mail, a text application, a SNS application, and an IM application.

When the execution request of the second application is detected, the controller 140 may extract information included in the first application screen at operation 205. In an embodiment of the present disclosure, it is assumed that the above mentioned information is text, and the text may include at least one of a word, a sentence, or a paragraph.

In an embodiment of the present disclosure, when extracting the text from among the information, the controller 140 may extract the text based on a word. In addition, when extracting the text based on a word, the controller 140 may previously extract a word (e.g., a word which appears more than two or three times) which is repeatedly displayed on the first application screen. In addition, the controller 140 may also extract location information of a sentence including the word. When displaying a word corresponding to the text which will be described later through the location information, the controller 140 may display a sentence preceded (or followed) by the above word.

The controller 140 may store the extracted information in the storage device at operation 207. In other words, according to an embodiment of the present disclosure, the DB may be configured based on the extracted information. In detail, the controller 140 may generate the extraction DB 121. The controller 140 may store the extracted information in the extraction DB 121. The extraction DB 121 may be a temporary DB for storing information extracted from the first application screen. The controller 140 may store the extracted information in the extraction DB 121 temporarily. For example, the controller 140 may store a word displayed on the first application screen in the extraction DB 121, and also may store location information of a sentence including the word simultaneously. The controller 140 may add the extraction DB 121 storing the information extracted from the first application screen to the existing prediction word DB 123. Accordingly, the controller 140 may update the existing prediction word DB 123 into a DB including the extraction DB 121.

In other words, when detecting the execution of the second application, the controller 140 may extract the information from the first application screen and store in the extraction DB 121. In addition, the controller 140 may update the prediction word DB by adding the extraction DB 121 to the existing prediction word DB 123. When detecting the input through the user interface of the second application which will be described later, the controller 140 may extract and display the recommendation objects corresponding to the input, partly in response to the input based on the updated DB. For example, the controller 140 may include the recommendation object (e. g., word corresponding to at least one character and/or sentence corresponding to word) corresponding to a word as well as at least one character based on the updated DB. In this case, when extracting and displaying the recommendation object corresponding to the input based on the updated prediction word DB, the priority of the extraction DB 121 may be set to be higher than the priority of the existing prediction word DB 123. The controller 140 may display the recommendation object of the extraction DB 121 as first priority, and then display the recommendation object of the prediction word DB 123 as second priority based on order of priority.

In an embodiment of the present disclosure, it is assumed that the operations of 205 and 207 may be performed when the execution request of the second application is detected at operation 203, but is not limited thereto, and the operations of 205 and 207 may be performed when a text input is detected in the second application screen at operation 211 which will be described later.

The controller 140 may control the display unit 131 to display the user interface of the second application according to the execution request of the second application at operation 209. The controller 140 may control the display unit 131 to display a keypad simultaneously, when displaying the user interface.

In an embodiment of the present disclosure, the user interface of the second application may be displayed in the form of multi-window screen which is at least one of a pop-up type or a screen division type.

When displaying the user interface of the second application in the multi-window screen of a pop-up type, if the second application is executed while the first application screen is displayed on full screen, a pop-up screen may be outputted on the display unit 131, and the screen of the second application may be outputted on the pop-up screen. In this case, the pop-up screen may be displayed to be overlaid on the screen of the first application. The overlaid screen may be adjusted to be displayed transparent or opaque.

When displaying the multi-window screen of a screen division type, if the second application is executed while the first application screen is displayed on full screen, the display unit 131 may be divided into two screens, and a screen of the first application may be displayed on a first division screen, and a screen of the second application may be displayed on a second division screen.

The controller 140 may detect an input through the user interface of the second application at operation 211. In an embodiment of the present disclosure, it is assumed that the input through the user interface is a text input, and the text may include at least one character.

The controller 140 may control the display unit 131 to extract and display the recommendation object corresponding to the input (e.g., text) based on the extraction DB 121 at operation 213. For example, when detecting the text input through the user interface of the second application, the controller 140 may display the recommendation object (e.g. a word preceded by the inputted text) corresponding to the inputted text. In an embodiment of the present disclosure, the recommendation object may be displayed based on the updated prediction word DB. In particular, the controller 140 may display the recommendation object of the recommendation DB 121 added to the updated prediction word DB 123 previously.

In an embodiment of the present disclosure, the controller 140 may display the recommendation object in a recommendation area. At least one of the word, the sentence, or the paragraph which is preceded by the inputted text may be displayed on the recommendation area. The recommendation area may be displayed on a key pad or near the keypad. When user inputs the contents of the first application screen to the second application screen which is able to receive an input, only a word may be required, but a sentence or a whole contents of paragraph may be required as well. In this case, as the sentence or the paragraph corresponding to the inputted text is displayed on the recommendation area, the user may easily input the contents of the first application screen to the second application screen displayed with multi-window screen.

For example, when detecting the text input through the user interface of the second application which is able to receive an input, the controller 140 may display a word corresponding to the text in the recommendation area. When detecting an input of selecting one of the words displayed on the recommendation area, the controller 140 may display the selected word on the user interface of the second application screen. Then, the controller 140 may display the word, the sentence and/or the paragraph that precedes (or follows) the word displayed on the user interface of the second application in the recommendation area. As described above, the controller 140 may store the location information of the sentence including the word, and may display the sentence and/or the paragraph that precedes (or follows) the word in the recommendation area through the location information.

The controller 140 may detect an input of selecting one of recommendation object displayed on the recommendation area at operation 215. In response to the selecting input, the controller 140 may display the recommendation object on the user interface of the second application at operation 217. In other words, the controller 140 may display the text inputted on the user interface of the second application into a selected recommendation object, that is, a completed word, sentence, and/or paragraph including the inputted text.

The controller 140 may detect that the second application is terminated. As the second application is terminated, the controller 140 may delete the information stored in the extraction DB 121. However, the controller 140 is not limited thereto, and the controller 140 may delete the information stored in the extraction DB 121 after a certain time is elapsed or maintain the storage state. Alternatively, the controller 140 may store the recommendation object displayed on the user interface of the second application which is selected at operation 215 among the recommendation object displayed on the recommendation area, and may delete the recommendation object which is not selected.

In an embodiment of the present disclosure, it is assumed that the input through the user interface of the second application is a text, but the input is not limited thereto, and image, audio, video, and emoticon may be included. Assuming that the input through the user interface is image, the controller 140 may store at least one image included in the first application screen into a clip board.

When extracting at least one image included in the first application screen, the controller 140 may automatically display a clipboard menu on at least portion of the user interface of the second application. Alternatively, when detecting a gesture (e.g., a long press gesture) for displaying the clipboard menu through the user interface of the second application, the controller 140 may display the clipboard menu in the location in which the gesture is detected. When detecting a gesture for displaying an image on the displayed clipboard menu, the controller 140 may display the extracted image in the recommendation area.

In various embodiments of the present disclosure, the controller 140 may display at least one image extracted from the first application screen on the user interface of the second application in a form of thumbnail (e.g., a clipboard execution window).

FIGS. 3A to 3D are diagrams illustrating a method of processing an input in a multi-window screen according to an embodiment of the present disclosure.

In the following description of FIG. 3A to FIG. 3D, it is assumed that the first application is an internet application and the second application is a note application.

Figure 3A:
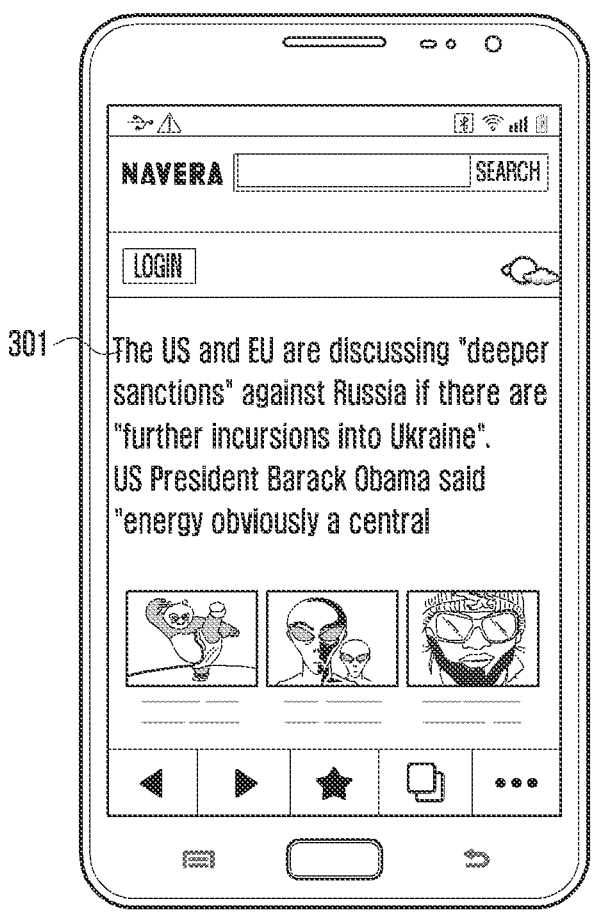
FIGS. 3A, 3B, 3C, and 3D are diagrams illustrating a method of processing an input in a multi-window screen according to an embodiment of the present disclosure.

Referring to FIG. 3A to FIG. 3D, the controller 140 may display an internet application screen in full screen as shown in 301 of FIG. 3A. The internet application screen 301 may be a screen for displaying information.

The controller 140 may detect the execution request of the note application. When the execution request of the note application is detected, the controller 140 may extract the information displayed on the internet application screen 301, and may configure a DB based on the extracted information.

As described above, the extracted information may be stored in the extraction DB 121, and the extraction DB 121 may be added to the existing prediction word DB 123. The controller 140 may update the prediction word DB 123 by including the extraction DB 121.

Figure 3B:
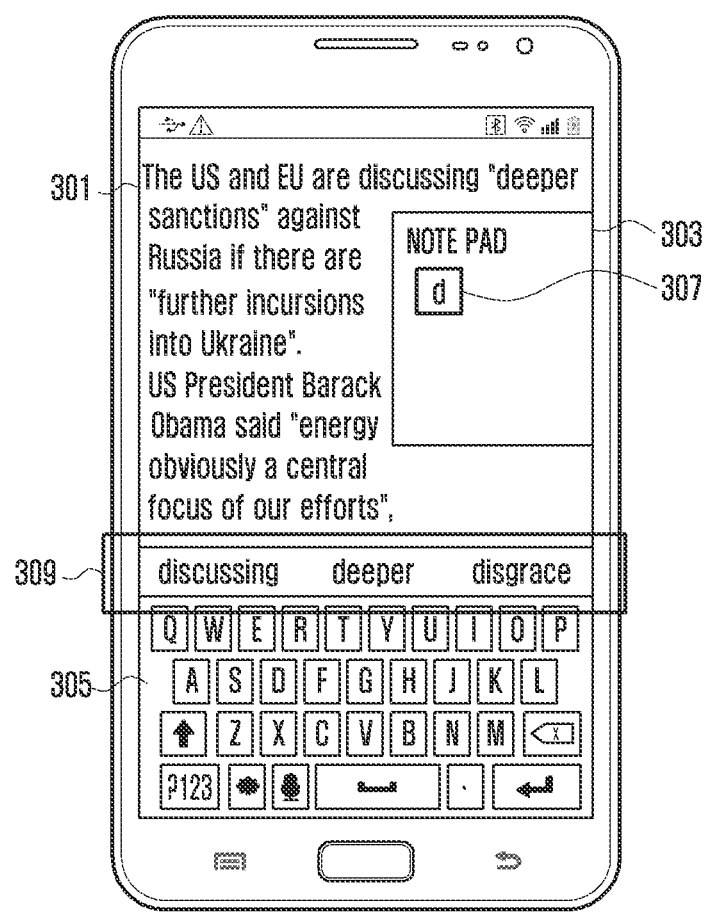

The controller 140 may display the note application with the multi-window screen of a pop-up type as shown in 303 of FIG. 3B. The controller 140 may detect the text input in the note application screen 303. In an embodiment of the present disclosure, when detecting the touch input in the note application screen 303 which is displayed as the note application is executed, the controller 140 may display the keypad as shown in 305 of FIG. 3B. Alternatively, the controller 140 may display simultaneously the note application screen 303 and the keypad 305 by executing the note application.

When detecting a text input "d" through the keypad 305, the controller 140 may display the text "d" on the note application screen 303 as shown in 307 of FIG. 3B. Then, the controller 140 may display at least one of the word, the sentence, the paragraph corresponding to the inputted text "d" 307 in the recommendation area based on the updated prediction word DB. For example, the controller 140 may display words "discussing", "deeper", "disgrace" corresponding to the text "d" 307 in the recommendation area as shown in 309 of FIG. 3B.

When displaying the recommendation object corresponding to the inputted text, the controller 140 may give priority to the extraction DB 121 added to the existing prediction word DB 123 to display the recommendation object of the extraction DB 121 as first priority, and may display the recommendation object of the existing prediction word DB 123 as second priority.

For example, the controller 140 may display the words "discussing", "deeper", corresponding to the recommendation object of the extraction DB 121, that is, the text "d" extracted from the internet application screen 301 in the recommendation area as first priority as shown in 309 of FIG. 3B. Further, the controller 140 may display the word "disgrace" corresponding to the text "d" extracted from the existing prediction word DB 123 in the recommendation area as second priority.

Figure 3C:
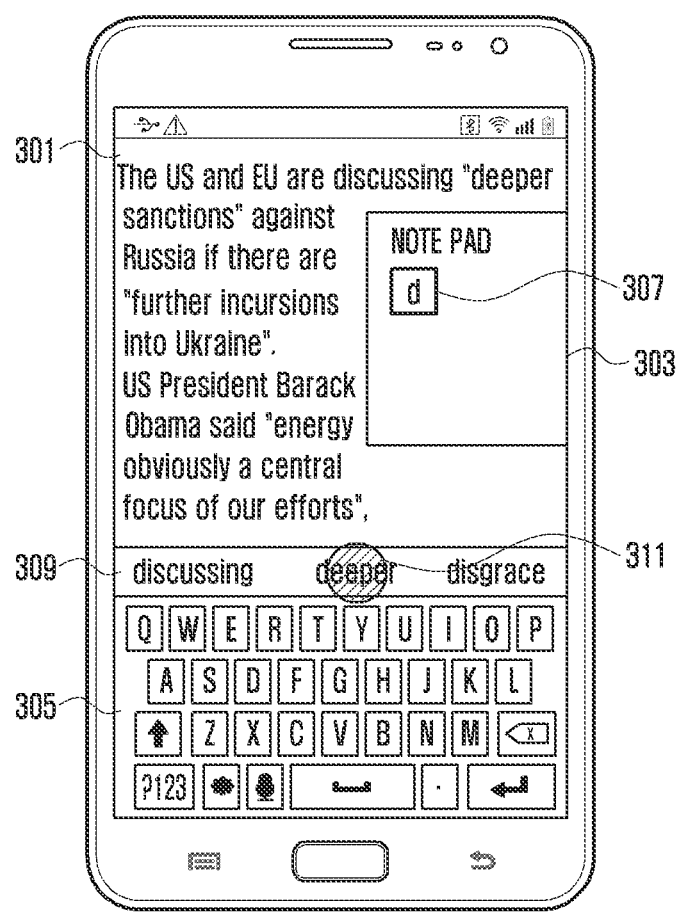
Figure 3D:
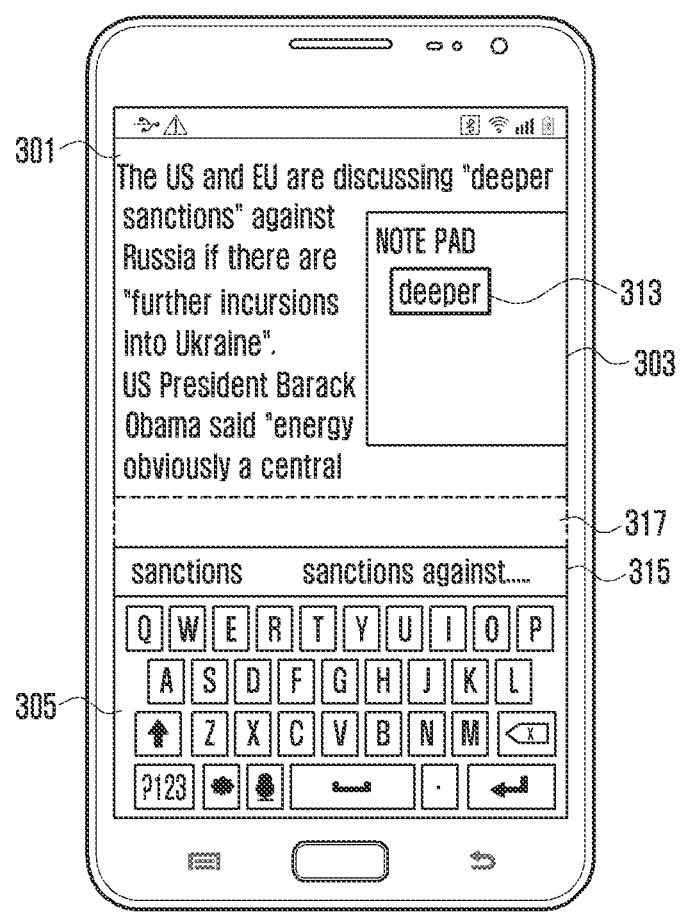

When detecting the selection of the word "deeper" as shown in 311 from among the words "discussing", "deeper", "disgrace" displayed on the recommendation area as shown in 309 of FIG. 3C, the controller 140 may display the selected word (i.e., "deeper") on the note application screen 303 as shown in 313 of FIG. 3D.

The controller 140 may display the word "sanctions" and/or the sentence "sanctions against . . ." preceded by the word "deeper" displayed on the note application screen 303 in the recommendation area as shown in 315 of FIG. 3D. When displaying sentence and/or paragraph in the recommendation area, if the sentence and/or the paragraph are/is long, the controller 140 may display the sentence and/or the paragraph by using ellipsis " . . . " In addition, when displaying sentence and/or paragraph in the recommendation area, if there is insufficient space to display the sentence and/or the paragraph, the controller 140 may add and display one line as shown in 317 of FIG. 3D.

Various embodiments of the present disclosure for processing an input in the multi-window screen will be described with reference to FIGS. 4A to 4D.

FIGS. 4A to 4D are diagrams illustrating a method of processing an input in a multi-window screen according to an embodiment of the present disclosure.

Figure 4A:
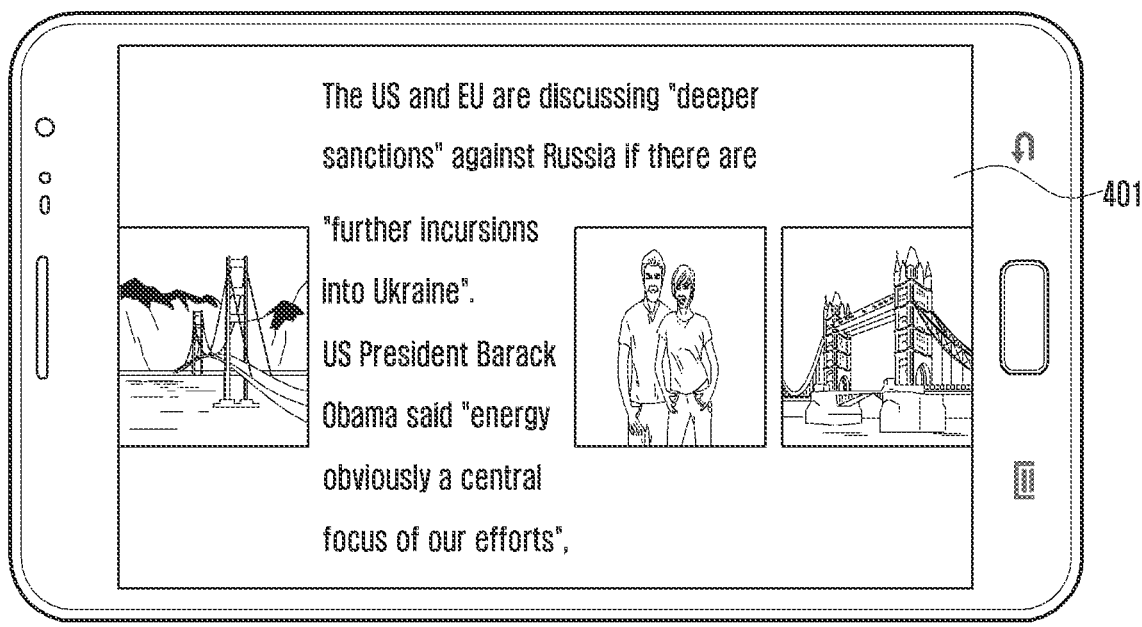
FIGS. 4A, 4B, 4C, and 4D are diagrams illustrating a method of processing an input in a multi-window screen according to an embodiment of the present disclosure.

Referring to FIGS. 4A to 4D, the controller 140 may display the internet application screen in full screen as shown in 401 of FIG. 4A. When detecting the execution request of note application while the internet application screen 401 is displayed, the controller 140 may extract information (e.g., text and/or image) displayed in the internet application screen 401. The controller 140 may generate the extraction DB 121 to store the extracted information. The generated extraction DB 121 may be added to the existing prediction word DB 123. That is, the existing prediction word DB 123 may be updated to a DB including the extraction DB 121.

Figure 4B:
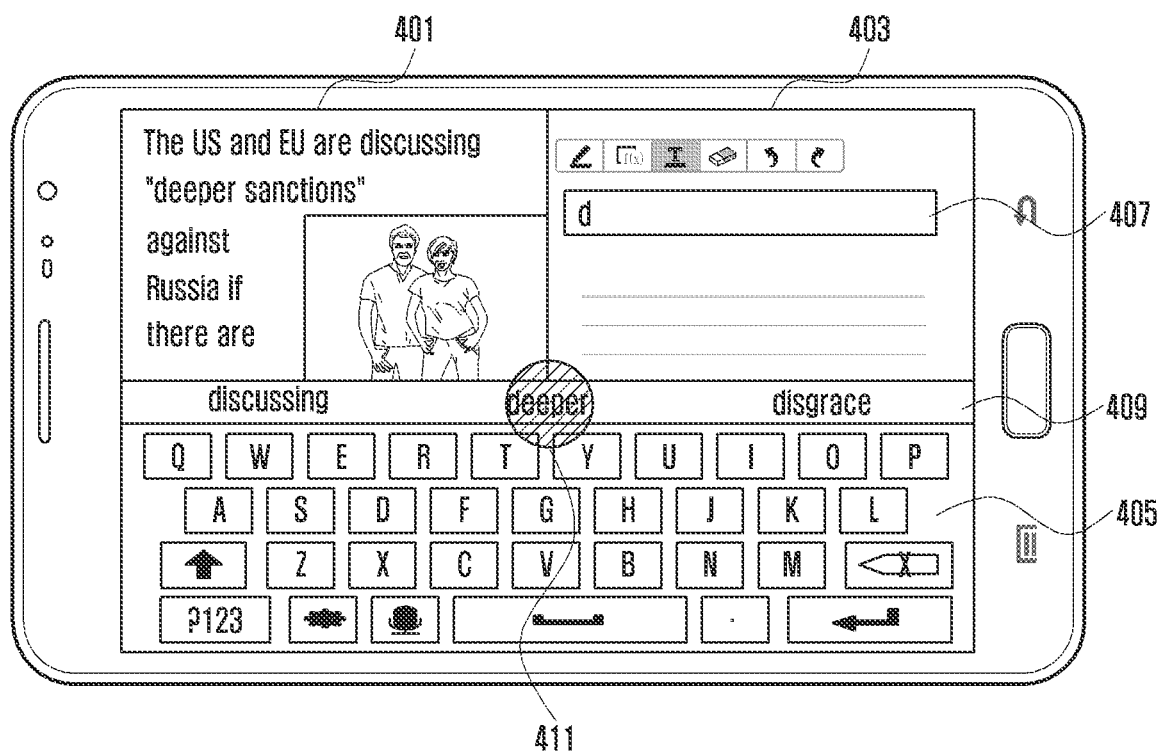

The controller 140 may display the note application according to the execution request of note application in the multi-window screen of a screen division type as shown in 403 of FIG. 4B.

When displaying the note application screen, the controller 140 may display a keypad 405 simultaneously. Alternatively, after displaying the note application screen, when detecting a gesture (e.g., a touch input on the note application screen) for inputting text on the note application screen, the controller 140 may display the keypad 405.

When detecting the text input "d" through the keypad 405 on the note application screen 403, the controller 140 may display the text "d" on the note application screen 403 as shown in 407 of FIG. 4B. The controller 140 may extract the words "discussing", "deeper", "disgrace" corresponding to the input text "d" 407 based on the updated DB and display as shown in 409.

Figure 4C:
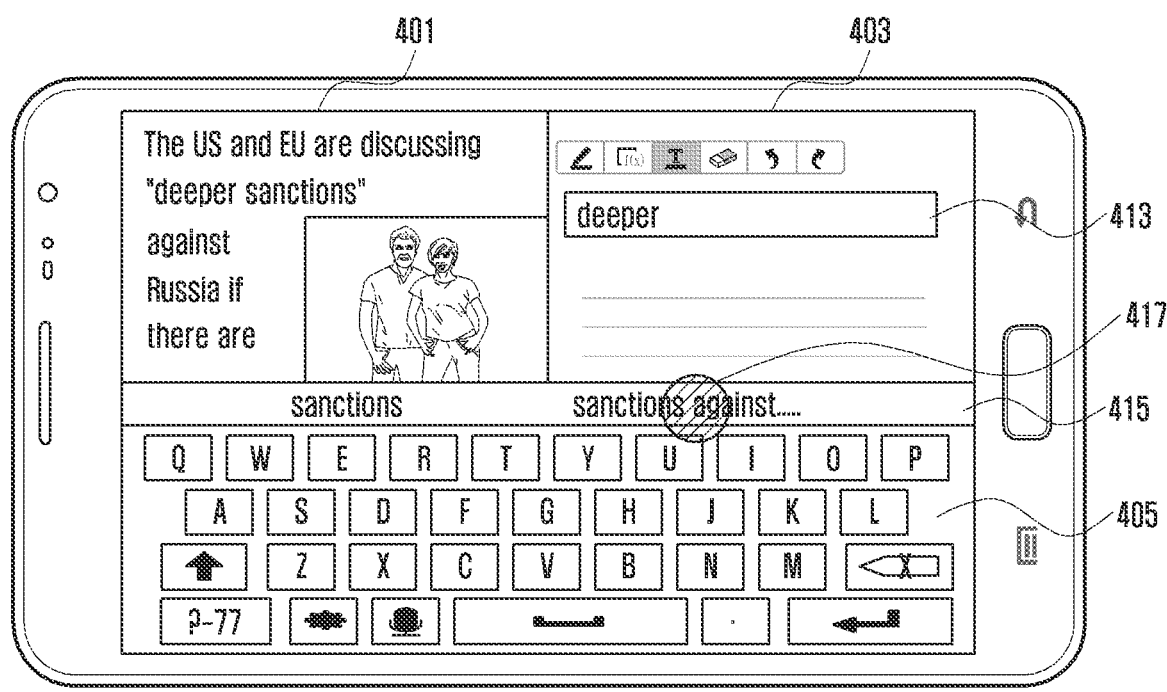
Figure 4D:
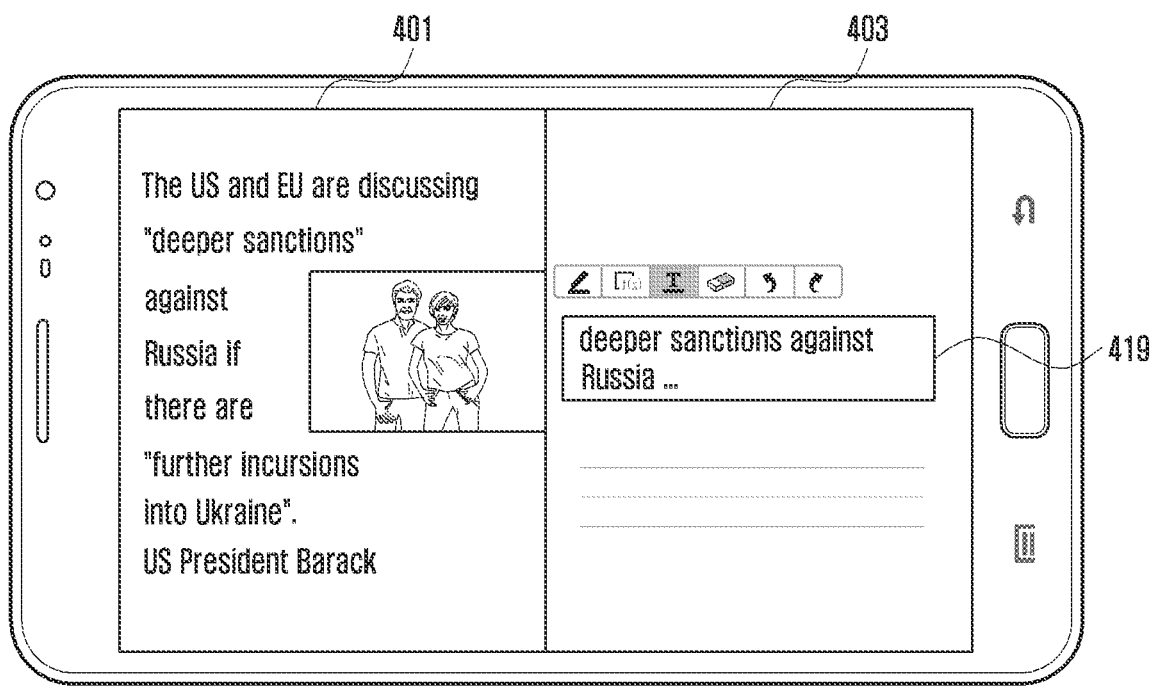

When detecting the selection of the word "deeper" as shown in 411 from among the words "discussing", "deeper", "disgrace" displayed in the recommendation area as shown in 409 of FIG. 4B, the controller 140 may display the selected word "deeper" on the note application screen 403 as shown in 413 of FIG. 4C. In addition, the controller 140 may display the word "sanctions" and/or the sentence "sanctions against . . ." preceded by the word "deeper" displayed on the note application screen 403 in the recommendation area as shown in 415 of FIG. 4C. When detecting the selection input from the sentence "sanctions against . . ." preceded by the word "deeper" as shown in 417, the controller 140 may display the entire selected sentence on the note application screen 403 as shown in 419 of FIG. 4D.

Figure 5A:
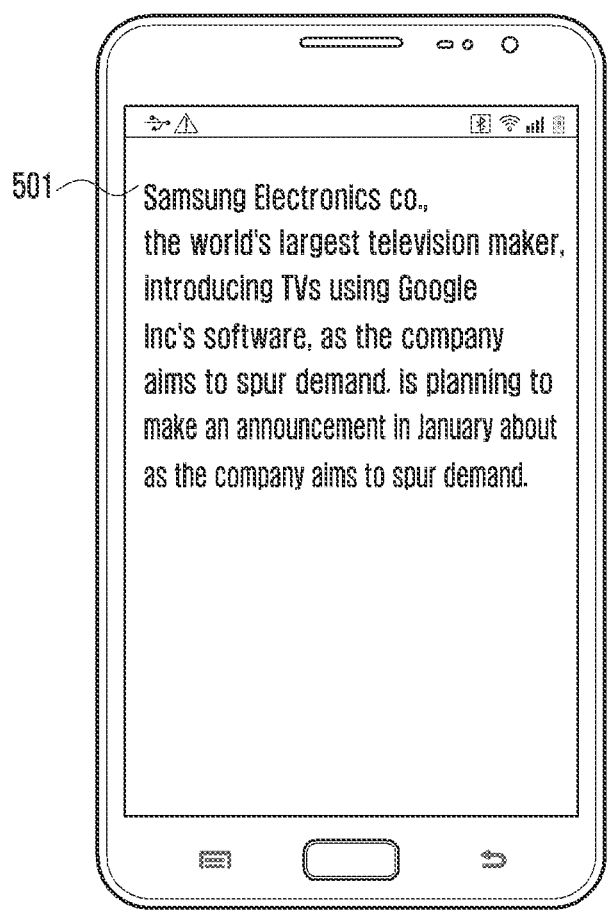
FIGS. 5A, 5B and 5C are diagrams illustrating a method of processing an input in a multi-window screen according to an embodiment of the present disclosure.
Figure 5B:
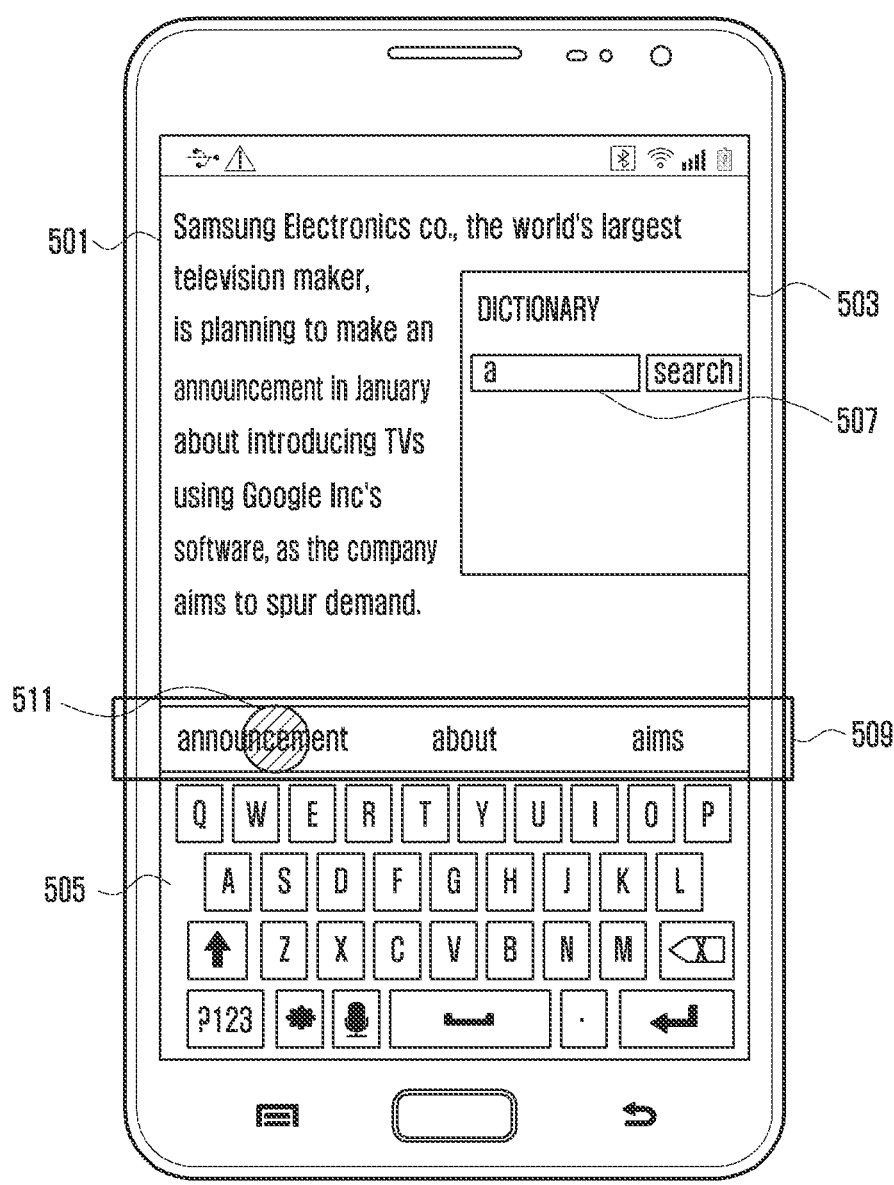
Figure 5C:
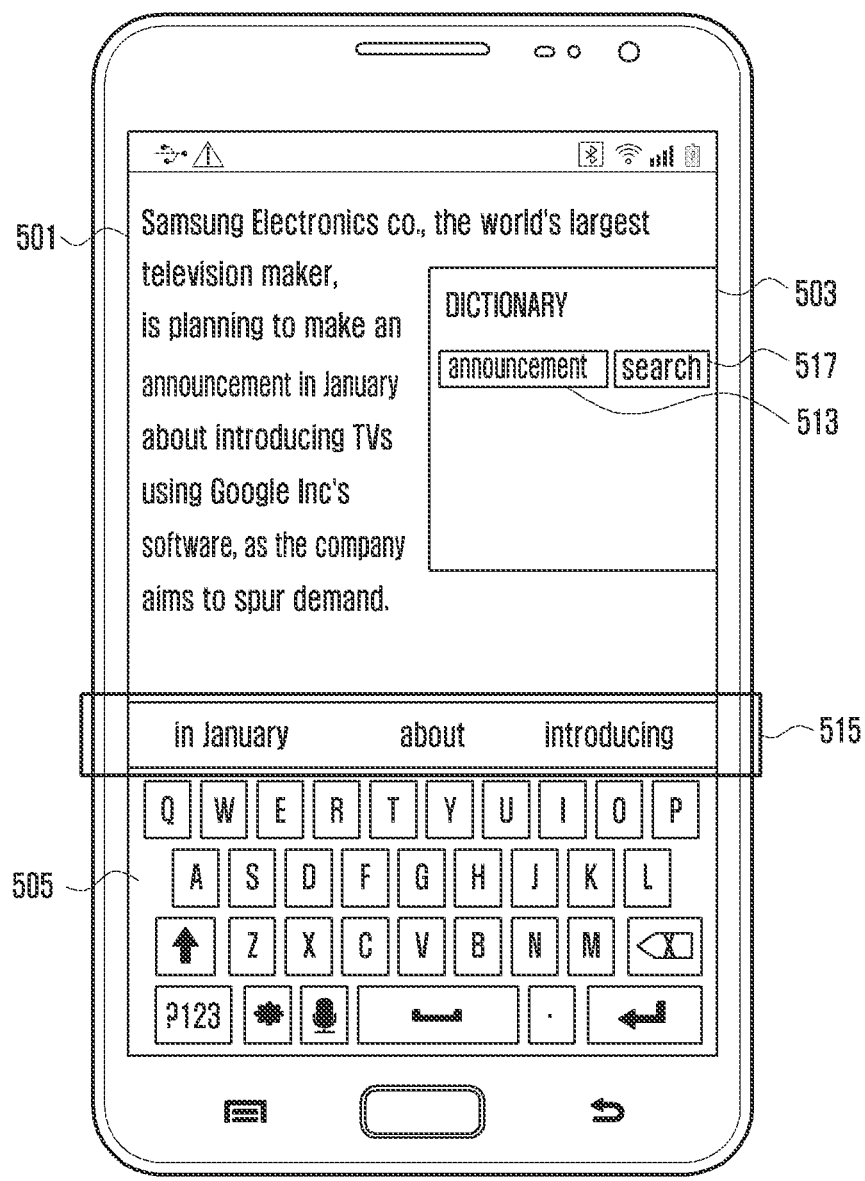

FIGS. 5A to 5C are diagrams illustrating a method of processing an input in multi-window screen according to an embodiment of the present disclosure.

Referring to FIGS. 5A to 5C, it is assumed that the first applications is an e-book, and the second application is a dictionary application.

Referring to FIGS. 5A to 5C, the controller 140 may detect the execution of the dictionary application while displaying an e-book application screen in full screen as shown in 501 of FIG. 5A. When detecting the execution of the dictionary application, the controller 140 may extract information (e.g., text) displayed on the e-book application screen 501. The controller 140 may generate the extraction DB 121 to store the extracted information. The generated extraction DB 121 may be added to the existing prediction word DB 123. That is, the existing prediction word DB 123 may be updated to a DB including the extraction DB 121.

The controller 140 may display a dictionary application screen in accordance with the execution request of dictionary application on the multi-window screen of a pop-up type as shown in 503 of FIG. 5B. The controller 140 may display a keypad 505 simultaneously when displaying the dictionary application screen. Alternatively, after displaying the dictionary application screen, when detecting a gesture (e.g., a touch input in an input field of the dictionary application screen) for inputting text from the dictionary application screen, the controller 140 may display the keypad 505.

When detecting a text input "a" through the keypad 505 on the dictionary application screen 503, the controller 140 may display the text "a", as shown in 507, in the input field of the dictionary application screen 503. The controller 140 may display, as shown in 509, words "announcement", "about", "aims" corresponding to the inputted text "a" 507 in the recommendation area based on the updated DB. As described above, in the operation of displaying a recommendation object corresponding to an input in the recommendation area, the controller 140 may set the priority of the extraction DB 121 to be higher than the priority of the existing prediction word DB 123. That is, the controller 140 may display the recommendation object of the extraction DB 121 as first priority, and may display the recommendation object of the existing prediction word DB 123 as second priority.

When detecting a selection of the word "announcement" as shown in 511 from among the words "announcement", "about", "aims" displayed in the recommendation area as shown in 509 of FIG. 5B, the controller 140 may display the selected word "announcement" in the input field of the dictionary application screen 503 as shown in 513 of FIG. 5C.

After displaying the word "announcement", when detecting the selection of a search button 517, the controller 140 may perform an operation of searching the word "announcement". Alternatively, the controller 140 may display, as shown in 515, the sentence "in January about introducing . . . " preceded by the word "announcement" displayed on the input field of the dictionary application screen 503. When detecting the selection of the sentence "in January about introducing . . . " 515, the controller 140 may display "announcement in January about introducing . . . " in the input field of the dictionary application screen 503. In addition, when detecting the selection of the search button 517, the controller 140 may perform an operation of searching the sentence "announcement in January about introducing . . . ."

Figure 6A:
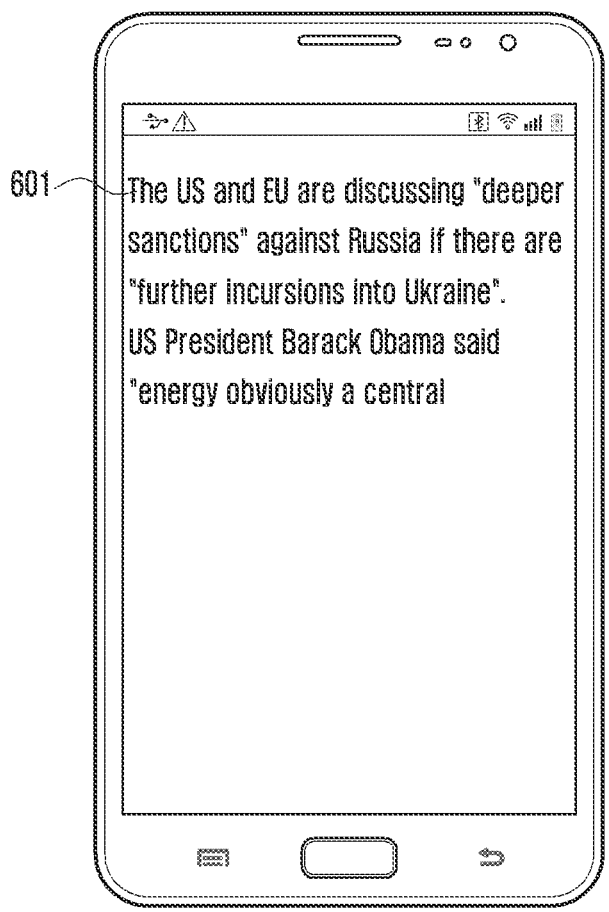
FIGS. 6A, 6B, and 6C are diagrams illustrating a method of processing an input in a multi-window screen according to an embodiment of the present disclosure.
Figure 6B:
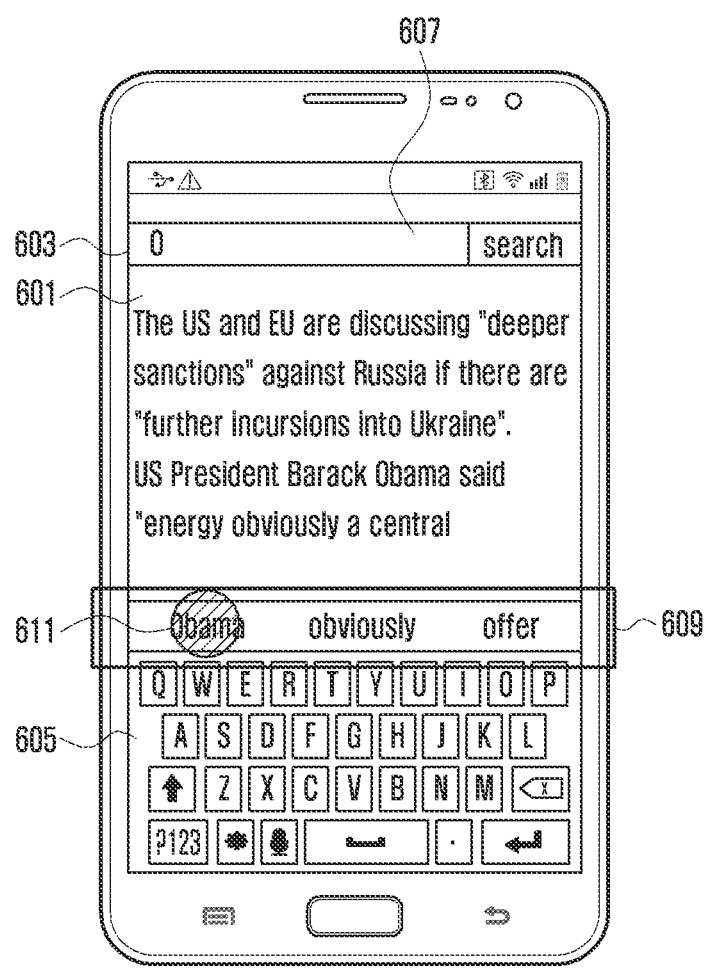
Figure 6C:
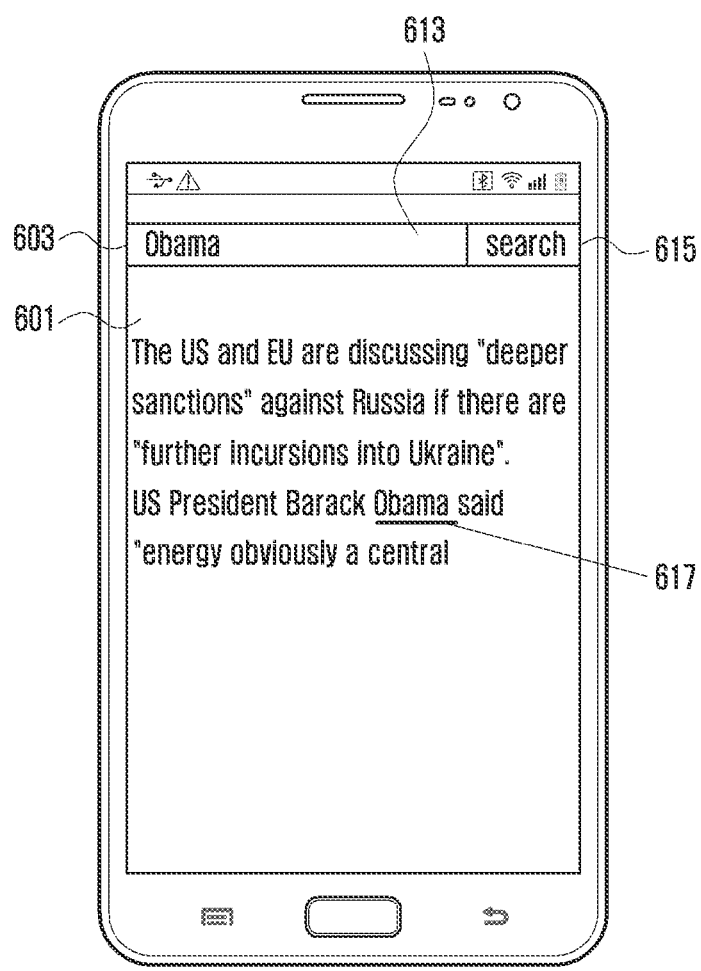

FIGS. 6A to 6C are diagrams illustrating a method of processing an input in a multi-window screen according to an embodiment of the present disclosure.

According to an embodiment of the present disclosure, in FIGS. 6A to 6C, it is assumed that the first applications is an internet application, and the second application is a search box.

Referring to FIGS. 6A to 6C, the controller 140 may detect the execution of the search box while displaying a web page screen in accordance with the execution of the internet application in full screen as shown in 601 of FIG. 6A. When detecting the execution of the search box, the controller 140 may extract information (e.g., text) displayed on the web page screen 601. The controller 140 may generate the extraction DB 121 to store the extracted information. As described above, the extraction DB 121 may be added to the existing prediction word DB 123. The controller 140 may update the existing prediction word DB 123 to a DB to which the extraction DB 121 is added.

The controller 140 may display the search box on the multi-window screen of a screen division type as shown in 603 of FIG. 6B according to the execution of the search box.

The controller 140 may display a keypad 605 simultaneously, when displaying the search box. Alternatively, after displaying the search box, when detecting a gesture (e.g., a touch input in the search box) for inputting text from the search box, the controller 140 may display the keypad 605.

When detecting a text input "o" through the keypad 605 in the search box 603, the controller 140 may display the text "o" in the search box 603 as shown in 607. The controller 140 may display, as shown in 609, words "Obama", "obviously", "offer" corresponding to the inputted text "o" 607 in the recommendation area based on the updated DB. As described above, the controller 140 may set the priority of the extraction DB 121 to be higher than the priority of the existing prediction word DB 123. That is, the controller 140 may display "Obama", "obviously" which is the recommendation object included in the web page, that is, the recommendation object of the extraction DB 121 as first priority, and may display "offer" which is the recommendation object of the existing prediction word DB 123 as second priority.

When detecting a selection of the word "Obama" as shown in 611 from among the words "Obama", "obviously", "offer" displayed in the recommendation area as shown in 609, the controller 140 may display the selected word "Obama" in the search box 603 as shown in 613 of FIG. 6C. When detecting the selection of a search button 615, the controller 140 may perform an operation of searching the word "Obama". For example, the controller 140 may underline, as shown in 617, the word that coincides with the searched word "Obama" to be distinguished from the word that does not coincide. In an embodiment of the present disclosure, it is assumed that the coincided word is underlined to be distinguished, but the coincided word is not limited thereto, and may be distinguished by colouring, patterning, or shading.

In the above-described method of processing an input in the multi-window screen, an operation of extracting the object was performed when the execution request of a second application is detected. However, in the following description of FIG. 7 and FIG. 8, the electronic device may configure a DB by extracting information previously while a first application screen is displayed. Thereafter, when the second application is executed, the electronic device may display the recommendation object corresponding to the input on the second application screen based on the previously extracted information.

Figure 7:
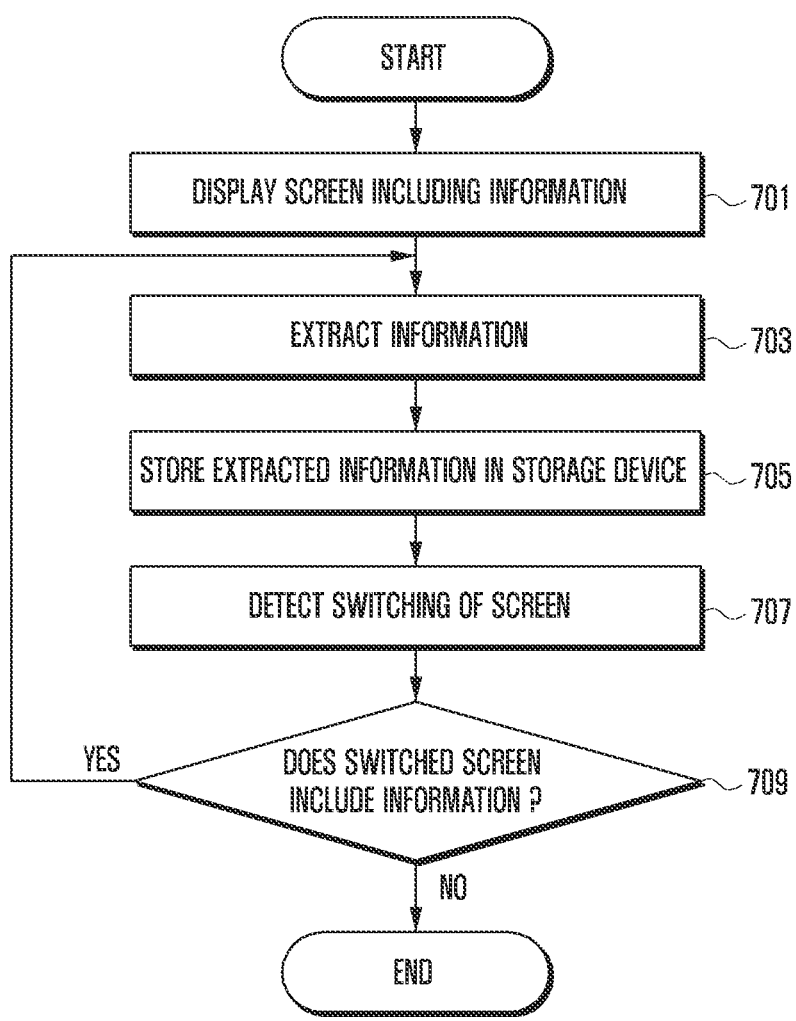
FIG. 7 is a diagram configuring a database (DB) according to an embodiment of the present disclosure.

FIG. 7 is a diagram configuring a DB in a method of processing an input in a multi-window screen according to an embodiment of the present disclosure.

Referring to FIG. 7, the controller 140 may display a screen including information at operation 701. The controller 140 may extract the information included in the screen at operation 703, and may store the extracted information in a storage device at operation 705. That is, the controller 140 may configure a DB based on the extracted information. Since the operation of configuring the DB is identical with the operation 207 of FIG. 2, a detailed description thereof is omitted.

The controller 140 may detect a switching of screen at operation 707. In an embodiment of the present disclosure, the switching of screen may include a switch to another page in the same application, and a switch to other application screen.

The controller 140 may determine whether the switched screen is a screen including information at operation 709. When the screen is a screen including information, the controller 140 proceeds to operation 703 to extract information and store in the storage device. In other words, the operation of extracting the information and storing in the storage device may be an operation of configuring the DB based on the extracted information. That is, the controller 140 may continuously accumulate the information extracted from the screen and store in the DB. The controller 140 may delete sequentially the accumulated and stored DB (or information) according to the stored time, after a certain time is elapsed.

On the other hand, when the screen is a screen that does not include information, the controller 140 may terminate an operation of extracting the information and/or an operation of configuring the DB.

When detecting an input through the user interface of a second application capable of receiving an input in FIG. 8 which will be described later, a recommendation object corresponding to the input may be extracted and displayed based on the previously configured DB in FIG. 7.

Figure 8:
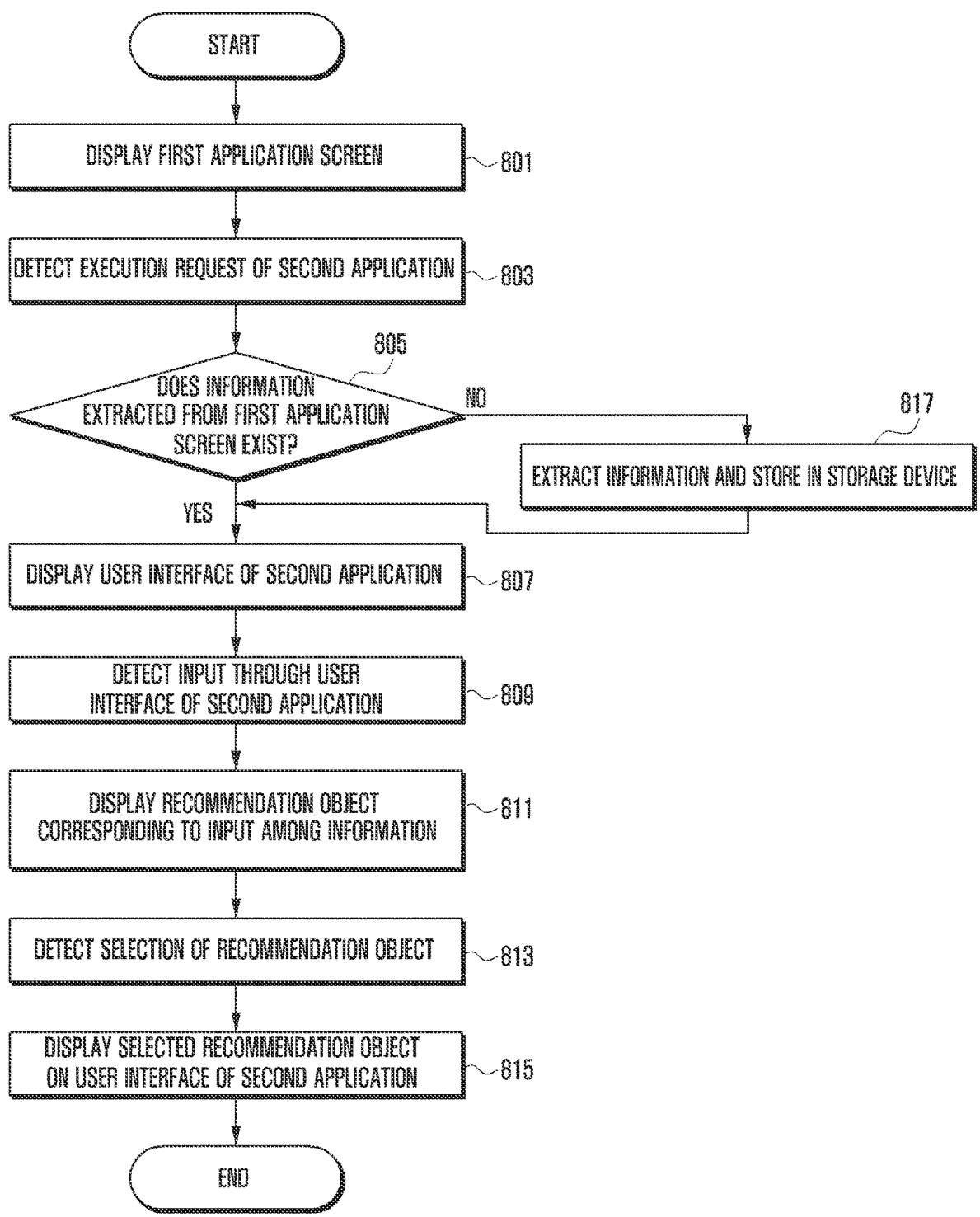
FIG. 8 is a flowchart illustrating a method of processing an input in a multi-window screen according to an embodiment of the present disclosure.

FIG. 8 is a flowchart illustrating a method of processing an input in a multi-window screen according to an embodiment of the present disclosure.

Referring to FIG. 8, the controller 140 may display a first application screen at operation 801. The first application screen according to an embodiment of the present disclosure may include information. Here, the information may include text, image, and the like. The controller 140 may detect an execution of a second application at operation 803.

When detecting the execution of a second application, the controller 140 may determine whether information extracted from the first application screen exists, at operation 805. When the information extracted from the first application screen does not exist in the storage unit 120, the controller 140 may extract information related with the first application and store in the storage device at operation 817. In other words, the controller 140 may configure a DB based on the extracted information. Since the operation 817, of configuring the DB is based on information is identical with the operations of 205 and 207 of FIG. 2, a detailed description thereof is omitted.

On the other hand, when the information extracted from the first application screen exists, the controller 140 may control the display unit 131 to display the user interface of the second application at operation 807. The user interface of the second application according to an embodiment of the present disclosure may be displayed in the form of a multi-window screen which is at least one of a pop-up type or a screen division type.

The controller 140 may detect an input through the user interface of the second application at operation 809. At operation 811, the controller 140 may display a recommendation object corresponding to the input based on the DB configured in FIG. 7 or at the operation 817. For example, when detecting a text input through the user interface of the second application, the controller 140 may display at least one of the word, the sentence, and/or the paragraph preceded by the inputted text.

The controller 140 may detect an input of selecting one of the recommendation objects (e.g., word, sentence, or paragraph preceded by inputted text) at operation 813. In response to the selecting input, the control 140 may display the selected recommendation object on the user interface of the second application at operation 815. In an embodiment of the present disclosure, it is assumed that the operation, which is the operation 805, of determining whether the extracted information exists in the storage unit 120 is performed when the execution of the second application is detected, but the operation not limited thereto, and may be performed when an input through user interface of the second application is detected.

Figure 9:
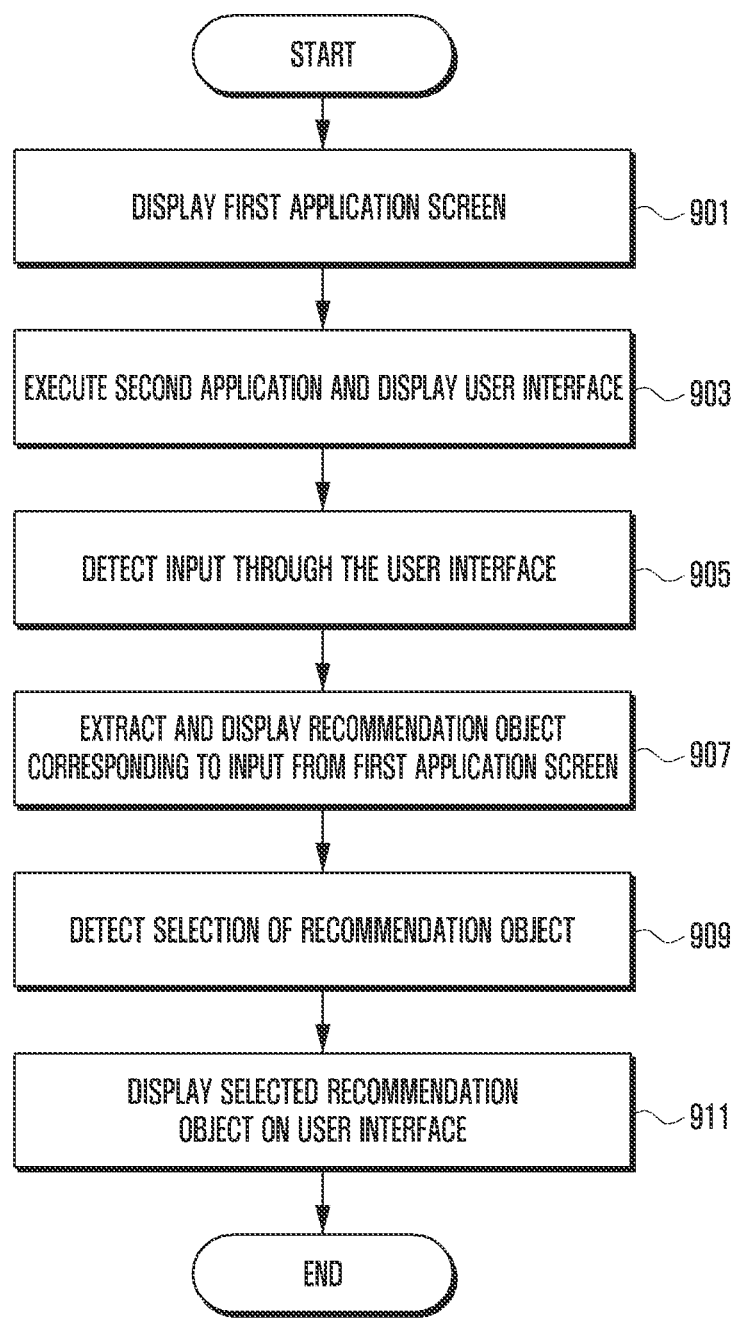
FIG. 9 is a flowchart illustrating a method of processing an input in a multi-window screen according to an embodiment of the present disclosure.

FIG. 9 is a flowchart illustrating a method of processing an input in multi-window screen according to an embodiment of the present disclosure.

In various embodiments of the present disclosure, FIG. 9 is a diagram illustrating a method of searching and displaying the recommendation object corresponding to an input on the first application screen, when detecting the input through the user interface of the second application.

Referring to FIG. 9, the controller 140 may display the first application screen at operation 901. In an embodiment of the present disclosure, the first application screen may be a screen that includes information. Here, the information may include text, image, and the like.

When detecting an execution request of the second application, the controller 140 may display a user interface of the second application at operation 903. The user interface of the second application according to an embodiment of the present disclosure may be displayed in the form of a multi-window screen which is at least one of a pop-up type or a screen division type.

The controller 140 may detect an input through the user interface of the second application at operation 905. When detecting an input through the user interface of the second application, the controller 140 may extract (e.g., search) and display the recommendation object corresponding to the input from among information included in the first application screen at operation 907. For example, when the input through the user interface is a text input, the operation of extracting (e.g., searching) the information may be an operation of searching based on the word preceded by the inputted text. However, the input is not limited thereto, and may search the sentence, and/or the paragraph preceded by the inputted text.

The controller 140 may detect an input of selecting one of the recommendation objects at operation 909. In response to the input of selecting one of the recommendation objects, the control 140 may display the recommendation object on the user interface of the second application at operation 911. That is, the controller 140 may display the text displayed on the user interface of the second application into a selected object, that is, a completed word, sentence, and/or paragraph including the text.

The electronic device and the operation method thereof according to an embodiment of the present disclosure may display a recommendation object in accordance with an input of a second application by priority in a recommendation area based on the information configured in a first application in a multi-window environment. Thus, user may quickly and accurately input the information to be inputted.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
   displaying, on a touch screen of the electronic device, an execution screen of a first application, the execution screen of the first application including at least one text;
   displaying, on the touch screen, a user interface of a second application while displaying the execution screen of the first application;
   detecting, by the electronic device, an input of a character on the user interface of the second application;
   in response to the input of the character:
      extracting at least one word including the inputted character among the at least one text included in the execution screen of the first application; and
      displaying, on the touch screen, the extracted at least one word including the inputted character;
   in response to selection of a word of the extracted at least one word including the inputted character, displaying, on the touch screen, the selected word on the user interface of the second application; and
   in response to displaying the selected word, displaying, on the touch screen as separate items, a word a paragraph preceded or followed by the displayed word extracted from the execution screen of the first application, wherein the second application is different than the first application.

2. The method of claim 1,
   wherein the displaying of the user interface of the second application comprises detecting an execution request of the second application, and
   wherein the method further comprises extracting the at least one word that is displayed by executing the first application, and storing the extracted at least one word in a memory of the electronic device, when detecting the execution request of the second application.

3. The method of claim 1, further comprising:
   extracting the at least one word that is displayed by executing the first application; and
   storing the extracted at least one word in a memory of the electronic device.

4. The method of claim 2, wherein the storing of the extracted at least one word in the memory of the electronic device comprises:
   generating an extraction database (DB);
   extracting the at least one word and storing the at least one word in the extraction DB; and
   adding the extraction DB to a prediction word DB to update the prediction word DB.

5. The method of claim 4, wherein the displaying of the at least one word comprises displaying a word of the extraction DB as a first priority.

6. The method of claim 1, wherein the displaying of the user interface of the second application comprises:
   displaying a keypad; and
   displaying the at least one word including the inputted character on the keypad or near the keypad.

7. The method of claim 1, wherein the user interface of the second application is displayed in a form of a multi-window which is at least one of a pop-up type or a screen division type.

8. The method of claim 4, wherein the extraction DB stores the extracted at least one word temporarily.

9. The method of claim 3, further comprising:
   determining whether the at least one word extracted from the execution screen of the first application is stored; and
   displaying the at least one word including the inputted character based on the stored at least one word in response to the input of the character, if the at least one word is stored.

10. The method of claim 1, further comprising:
    searching and displaying the at least one word including the inputted character among the at least one text included in the execution screen of the first application, when detecting the input of the character.

11. The method of claim 8, further comprising at least one of:
    deleting the at least one word stored in the extraction DB, when detecting a termination of the second application; or
    storing a selected word, and deleting an unselected at least one word.

12. An electronic device comprising: a touch screen; and a processor configured to:
    control the touch screen to display an execution screen of a first application, the execution screen of the first application including at least one text,
    control the touch screen to display a user interface of a second application while displaying the execution screen of the first application,
    detect an input of a character on the user interface of the second application,
    in response to the input of the character: extract at least one word including the inputted character among the at least one text included in the execution screen of the first application, and control the touch screen to display the extracted at least one word including the inputted character,
    in response to selection of a word of the extracted at least one word including the inputted character, control the touch screen to display the selected word on the user interface of the second application, and
    in response to displaying the selected word, control the touch screen to display as separate items, a word a paragraph preceded or followed by the displayed word extracted from the execution screen of the first application, wherein the second application is different than the first application.

13. The electronic device of claim 12, wherein the processor is further configured to extract the at least one word included in the execution screen of the first application and store the at least one word in a memory, when detecting an execution request of the second application or displaying the execution screen of the first application.

14. The electronic device of claim 13, wherein the processor is further configured to:
    generate an extraction database (DB),
    extract the at least one word to store in the extraction DB,
    add the extraction DB to a prediction word DB to update the prediction word DB,
    control to delete the at least one word stored in the extraction DB, when detecting a termination of the second application, and store a selected word, and delete an unselected at least one word.

15. The electronic device of claim 12, wherein the processor is further configured to:
control the touch screen to display a keypad together with the user interface of the second application, and
display the at least one word including the inputted character on the keypad or near the keypad.

16. The electronic device of claim 13, wherein the processor is further configured to:
determine whether the at least one word extracted from the execution screen of the first application is stored, when detecting an execution request of the second application, and
control the touch screen to display the at least one word including the inputted character based on the stored at least one word in response to the input of the character, if the at least one word is stored.

17. The electronic device of claim 12, wherein the processor is further configured to search and display the at least one word including the inputted character among the at least one text included in the execution screen of the first application, when detecting the input of the character.

* * * * *